United States Patent
Shiu et al.

(10) Patent No.: US 7,653,028 B2
(45) Date of Patent: Jan. 26, 2010

(54) SCHEDULING TECHNIQUES FOR A PACKET-ACCESS NETWORK

(75) Inventors: Da-shan Shiu, San Jose, CA (US); Durga P. Malladi, San Diego, CA (US)

(73) Assignee: Qualcomm Incorporated

( * ) Notice: Subject to any disclaimer, the term of this patent is extended or adjusted under 35 U.S.C. 154(b) by 41 days.

(21) Appl. No.: 10/264,434

(22) Filed: Oct. 3, 2002

(65) Prior Publication Data

US 2004/0066766 A1  Apr. 8, 2004

(51) Int. Cl.
H04B 7/216 (2006.01)
H04W 72/00 (2006.01)

(52) U.S. Cl. .................. 370/335; 370/342; 370/441; 455/452.2

(58) Field of Classification Search .............. 370/209, 370/252, 328, 335, 342, 441
See application file for complete search history.

(56) References Cited

U.S. PATENT DOCUMENTS

| | | | | |
|---|---|---|---|---|
| 5,151,919 A | * | 9/1992 | Dent | 370/209 |
| 5,218,619 A | * | 6/1993 | Dent | 370/209 |
| 5,280,472 A | * | 1/1994 | Gilhousen et al. | 370/335 |
| 5,343,496 A | * | 8/1994 | Honig et al. | 370/342 |
| 6,298,050 B1 | * | 10/2001 | van Heeswyk et al. | 370/335 |
| 6,404,760 B1 | | 6/2002 | Holtzman et al. | |
| 6,426,960 B2 | | 7/2002 | Antonio | |
| 6,587,826 B1 | * | 7/2003 | Laneman et al. | 704/503 |
| 6,597,679 B1 | * | 7/2003 | Willars | 370/342 |
| 6,868,076 B2 | | 3/2005 | Kowalski et al. | |
| 7,068,614 B2 | * | 6/2006 | Zheng | 370/311 |
| 7,103,376 B2 | * | 9/2006 | Takano et al. | 455/522 |
| 7,194,269 B2 | * | 3/2007 | Sydor | 455/446 |
| 7,257,407 B2 | * | 8/2007 | Dacosta et al. | 455/452.1 |
| 2002/0006121 A1 | * | 1/2002 | George | 370/329 |
| 2002/0085623 A1 | * | 7/2002 | Madkour et al. | 375/148 |
| 2002/0098860 A1 | * | 7/2002 | Pecen et al. | 455/522 |
| 2003/0012264 A1 | * | 1/2003 | Papasakellariou et al. | 375/148 |

(Continued)

FOREIGN PATENT DOCUMENTS

EP  0993127  4/2000

(Continued)

OTHER PUBLICATIONS

Ewerbring et al., CDMA-IC: A Proposal for Future High Capacity Digital Cellular Systems, IEEE vol. Conf. 43, May 18, 1993, pp. 440-443.*

(Continued)

Primary Examiner—Gregory B Sefcheck
(74) Attorney, Agent, or Firm—D. Scott Juneau

(57) ABSTRACT

Multiple access interference may be substantially removed by introducing a near-far situation in which a near mobile and a far mobile ("near" and "far" based on signal strength) are selected, resources allocated among these and other mobiles, and the data is packetized for transmission during a transmission interval such that the data intended for the far mobile is transmitted along with the data intended for the near mobile. Forward link signals are then appropriately scheduled. Signals intended for the far mobile and the near mobile are decoded from the composite signal received at the near mobile. The signal intended for the far mobile is then removed from the composite signal received at the near mobile.

23 Claims, 6 Drawing Sheets

U.S. PATENT DOCUMENTS

| | | | |
|---|---|---|---|
| 2003/0054807 A1* | 3/2003 | Hsu et al. | 455/414 |
| 2003/0095529 A1* | 5/2003 | Petre et al. | 370/342 |
| 2004/0042426 A1* | 3/2004 | Harris et al. | 370/331 |

FOREIGN PATENT DOCUMENTS

| | | |
|---|---|---|
| WO | 9303556 | 2/1993 |

OTHER PUBLICATIONS

Ewerbring, M. et al., "CDMA-IC: a Proposal for Future High Capacity Digital Cellular Systems," Personal Communication—Freedom Through Wireless Technology, Secaucus, NJ, May 18-20, 1993, Proceedings of the Vehicular Technology Conference, New York, IEEE, US, vol. Conf. 43, May 18, 1993, pp. 440-443.

International Search Report, PCT/US2003/031722—International Search Authority—European Patent Office, Apr. 2, 2004.

International Preliminary Examination Report, PCT/US2003/031722—International Preliminary Examining Authority—US, Mar. 21, 2005.

* cited by examiner

SCHEDULING TECHNIQUES FOR A PACKET-ACCESS NETWORK

BACKGROUND

1. Field

The present invention relates generally to telecommunication systems, and more specifically to scheduling techniques in such systems.

2. Background

Enhancements to third-generation (3G) data services for code-division multiple access 2000 (cdma2000) and wideband code-division multiple access (WCDMA) are being developed. Such enhancements are called 1x evolution for data and voice (1xEV-DV) and high-speed downlink packet access (HSDPA), respectively. In these systems, the telecommunication network has almost total control in terms of dynamically assigning the available spreading code space and transmission energy to mobiles in a time scale of one to two milliseconds. A mobile may continuously provide feedback to the network in the form of an indicator to help the network optimize the use of resources. To effectively operate such networks, it is advantageous for a base station to serve only a small number of users at any given time, especially to those users who indicate that their channel conditions are good. The data rate of transmissions can be chosen such that the frame error probability is reasonable.

In the above-mentioned services, each user is assigned a unique spreading code when they have information to send. The same frequencies can be used by each user, because the receiver, which is listening for that user's specific code, is able to effectively ignore other users' signals as long as the codes are orthogonal. A problem with this solution is that multipath propagation is prevalent in the wireless environment, and causes the code sequences to deviate from being orthogonal. This results in interference between users within a cell called "multiple access interference", which ultimately limits the capacity of the cell. Consequently, if the radio propagation between a base station and a remote station exhibits multipath, then the energy spent on common channels and other users will interfere with the desired code channel.

There is therefore a need in the art for scheduling to transmit data packets in such a way as to reduce the multiple access interference.

SUMMARY

Embodiments disclosed herein address the above stated needs by appropriately scheduling forward link data and substantially removing interference from unwanted sources.

In one aspect, multiple access interference may be substantially reduced by configuring communications in a cell for a near-far situation in which a near mobile and a far mobile are selected, resources are allocated among these and other mobiles, and the data is packetized for transmission during a transmission interval such that the data intended for the far mobile is transmitted along with the data intended for the near mobile. Forward link signals are then appropriately scheduled. At the near mobile, the received signal includes a signal intended for the far mobile and the near mobile, both of which are decoded. The signal intended for the far mobile is then substantially removed from the signal received at the near mobile.

In another aspect, a base station apparatus includes a transceiver configured to receive reverse link signals that have been transmitted from a plurality of mobiles, and to transmit appropriately-powered forward link signals to the mobiles. The base station apparatus also includes a digital signal processor and a general purpose processor. The digital signal processor is configured to demodulate and decode reverse link signals, and to modulate and encode forward link signals. The general purpose processor is configured to determine the amount of power that should be allocated to each forward link signal. The general purpose processor also includes a scheduler that is configured for a near-far situation and schedules transmission of appropriately-powered forward link signals to the mobiles.

In a further aspect, a mobile apparatus includes a transceiver configured to receive forward link signals that have been transmitted from a base station apparatus, and to transmit appropriately-powered reverse link signals to the base station apparatus. The mobile apparatus also includes a digital signal processor and a general purpose processor. The digital signal processor is configured to demodulate and decode forward link signals, and to modulate and encode reverse link signals. The general purpose processor is configured to determine and separate from the received forward link signals, a signal intended for at least one far mobile apparatus and a signal intended for a near mobile apparatus. The general purpose processor then substantially removes the signal intended for the at least one far mobile from the forward link signal received at the near mobile apparatus.

DETAILED DESCRIPTION

Figure 1:
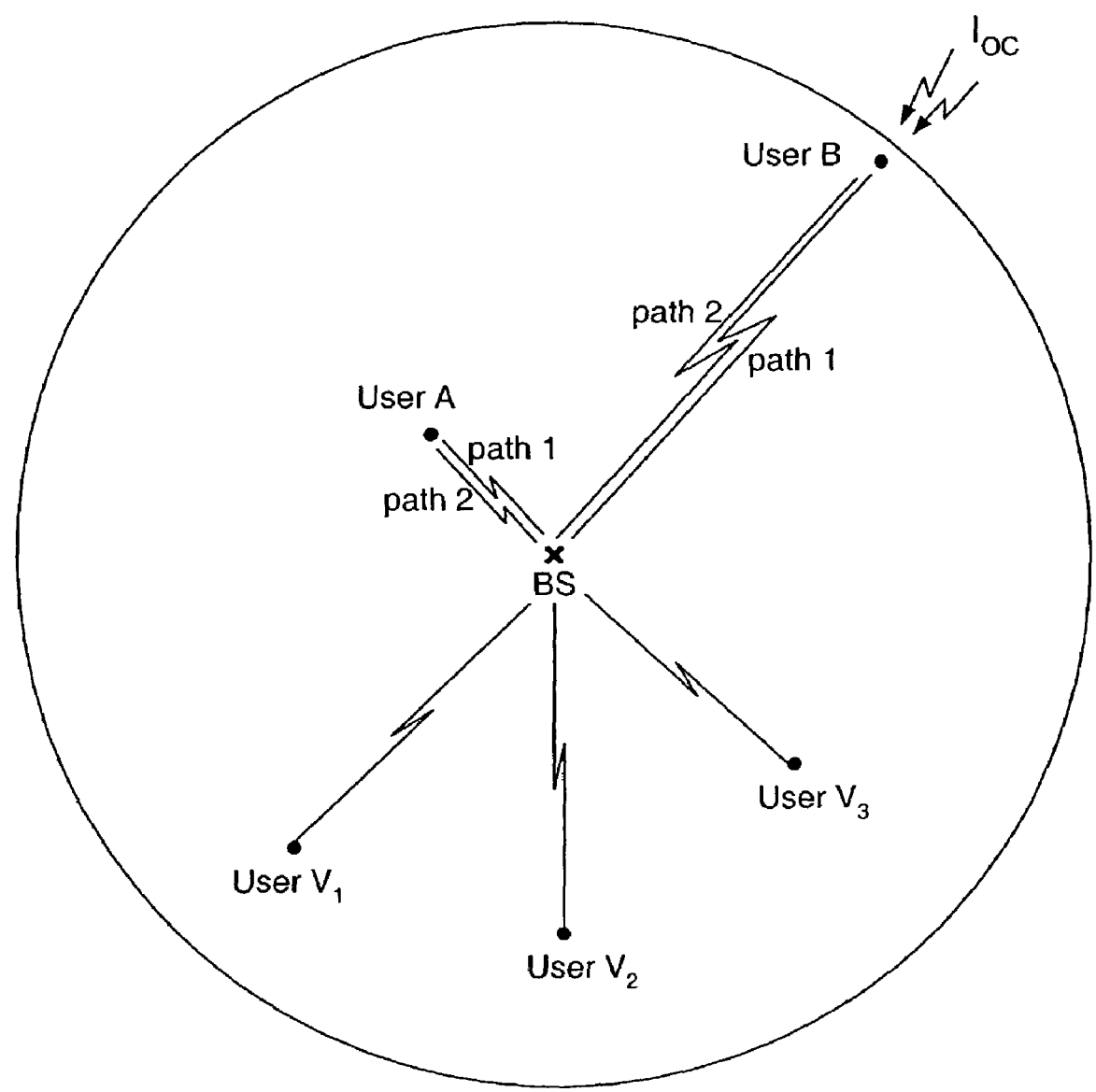
FIG. 1 illustrates a case where a base station (BS) is serving a number of low rate voice mobiles $V_1$ through $V_3$, and two high data rate mobiles A and B according to an embodiment of the invention.

The word "exemplary" is used herein to mean "serving as an example, instance, or illustration." Any embodiment described herein as "exemplary" is not necessarily to be construed as preferred or advantageous over other embodiments.

In recognition of the above-stated difficulties associated with conventional scheduling techniques, this disclosure describes exemplary embodiments for network data transmission scheduling that substantially reduces multiple access interference. In particular, a scheduler configures the base station for a near-far situation within a particular cell of the network in which the near remote station or mobile (i.e., the remote station or mobile that is nearer to the base station than the far mobile, where "near and "far" are inferred from the observed signal strength) receives a composite signal comprising a signal intended for the near mobile and a signal intended for a far mobile, and substantially removes the signal intended for the far mobile from the composite signal received at the near mobile. This removal of the unwanted far mobile signal from the received near mobile composite signal substantially increases the throughput of the particular cell. In one embodiment, the scheduler is located in the base station.

The mobile computes the channel state feedback information, such as a signal-to-interference-and-noise ratio (SINR) of the common pilot channel, and sends this information back to the base station. The base station collects all the channel state feedback information and performs resource allocation among all the mobiles, including determining the energy to be used to transmit to each mobile. The near mobile may be regarded as the mobile with the strongest SINR while the far mobile may be regarded as the mobile with the weakest SINR. Hence, although the mobiles are labeled in terms of distance, in implementation, the labels of the mobiles (as "near" or "far") are determined by the level of the computed SINR.

For the near mobile, the power of the signal that is received from the selected base station may be substantially larger than the interference from other cells (i.e., inter-cell interference), and therefore canceling out the signal power intended for the far mobile (as well as other mobiles if desired) but received at the near mobile may significantly increase the SINR, and in turn, the throughput of the cell. Consequently, for purposes of illustration and not for purposes of limitation, the exemplary embodiments of the invention are described in a manner consistent with such use, though the invention is not so limited.

In an environment where there is no multipath, signals to the mobiles are all orthogonal to each other. For a particular mobile in this environment, there is no noise contribution from other mobiles, and thus, no cancellation of multiple access interference (i.e., interference from other mobiles) is necessary for improved signal decoding. Hence, where there is no multipath, a particular mobile will receive the data packet and decode the packet without any concern for the multiple access interference. However, in a network environment where there is multipath, signals to mobiles can interfere with each other. In such an environment, a mobile that is relatively farther away (a "far mobile" as indicated by a lower SINR value at the base station) from the base station than other mobiles experiences, interference that is dominated by interference from signals being transmitted in other cells (inter-cell interference). The interference among mobiles within a cell (multiple access interference or "intra-cell" interference) is a small portion of the total interference at the far mobile, and thus, cancellation of this multiple access interference provides relatively small advantage. However, for a mobile that is relatively closer (a "near mobile" as indicated by a higher SINR value at the base station) to the base station than other mobiles, the multiple access interference forms a relatively large portion of the total interference compared to the inter-cell interference.

For example, FIG. 1 illustrates a case where a base station (BS) is serving a number of low rate voice mobiles $V_1$ through $V_3$, and two high data rate mobiles A and B. Mobile B is farther away from the base station (it is a "far mobile") than mobile A (the "near mobile). Hence, most of the time the network must use more energy and a lower modulation format to send data to mobile B. Therefore, the high-energy signal transmitted from the BS to mobile B, which is also received at mobile A, represents undesirable high-energy interference for mobile A. It is advantageous for mobile A to substantially reduce or eliminate this unwanted high-energy interference. To accomplish the cancellation of this unwanted interference, a scheduler in the base station may be configured for a near-far situation in which the near mobile is configured to decode the composite received signal, identify the signal intended for the far mobile, and to substantially reduce or cancel out that far mobile signal from the composite received signal, as well as reducing or canceling signals from other mobiles, if desired.

In allocating resources, the scheduler may allocate total power, $$I_{or} = I_{or,A} + I_{or,B} + I_{or,co} + I_{or,other},$$

transmitted from the base station to various channels, where $I_{or,A}$ is power allotted to mobile A, $I_{or,B}$ is power allotted to mobile B, $I_{or,co}$ is power allotted to common overhead channel (e.g., pilot channel), and $I_{or,other}$ is power allotted to other users. Thus, the data packets received by the mobiles will be received in signals of varying power. The received power may then be combined with the interference noise power from other cells (i.e., inter-cell interference) to compute the SINR seen by a mobile for a particular path. For example, for mobile A, the total power received from the selected base station may be expressed as $$\hat{I}_{or} = \hat{I}_{or,A} + \hat{I}_{or,B},$$

where $\hat{I}_{or,A}$ is the power received at mobile A that is intended for mobile A, and $\hat{I}_{or,B}$ is the power received at mobile A that is intended for mobile B. Furthermore, other cell interference may be expressed as $I_{oc}$. The SINR for path 1 of mobile A may then be expressed as $$SINR_{1,A} = \frac{\hat{I}_{or,1,A}}{I_{oc} + \hat{I}_{or,2,A} + \hat{I}_{or,*,B}},$$

where $SINR_{i,j}$ represents the SINR value for $i^{th}$ path of mobile j. This expression may be generalized for any path i or mobile j as $$SINR_{i,j} = \frac{\hat{I}_{or,i,j}}{I_{oc} + \sum_{j=1}^{J} \sum_{k=1, k \neq i}^{K} \hat{I}_{or,k,j}},$$

where J is the total number of mobiles and K is the total number of paths.

For a near mobile A, the inter-cell interference, $I_{oc}$, is substantially smaller than the interference from other mobiles such as $\hat{I}_{or,B}$. Since the near mobile A receives a signal that has sufficient power to decode packets that are intended for both mobiles A and B, the mobile A first decodes the signal intended for mobile B and uses the phase and power of the mobile B signal to cancel out the interfering signal, $\hat{I}_{or,B}$.

The signal received at the near mobile A may be expressed as $$r = S_A + S_B + S_{other},$$

where $S_A$ is the signal intended for mobile A, $S_B$ is the signal intended for mobile B, and $S_{other}$ is other signals or interferences such as inter-cell interference, $I_{oc}$. Thus, $S_A$ acts as noise to mobile B while $S_B$ acts as noise to mobile A. The term $I_{oc}$ is noise for both mobiles A and B. However, as described above, $I_{oc}$ is a larger portion of the noise for mobile B than mobile A. The term $s_B$ (with stronger signal strength than $S_A$) may be canceled out from the signal r received from the base station at the near mobile A. Accordingly, the SINR of the mobile A may be significantly improved by decoding the processed signal $$\hat{r} = r - \hat{S}_B,$$

where $\hat{S}_B$ denotes decoded signal intended for mobile B, and $\hat{r}$ denotes decoded signal for mobile A after canceling out the noise in the signal intended for mobile B.

To enable this cancellation of multiple access interference, the scheduler, in one embodiment, introduces a near-far situation by configuring the packetization of signals such that data packets intended for mobile B (the far mobile) are transmitted along with packets intended for mobile A (the near mobile). The introduction of this near-far situation enables the near mobile to first decode signals for cancellation and then decode the signal intended for the near mobile itself. To decode packets intended for other far mobiles, the near mobile needs to know certain control information, such as Walsh codes and utilized modulation. Thus, in the exemplary embodiment discussed above, the control information of the mobiles in a cell is ordered according to the distance (i.e., the signal strength), from the farthest mobile to the nearest mobile. Accordingly, near mobile A first decodes the control information of the far mobiles (mobile B and other mobiles) and then decodes its own control information at the end.

Figure 2:
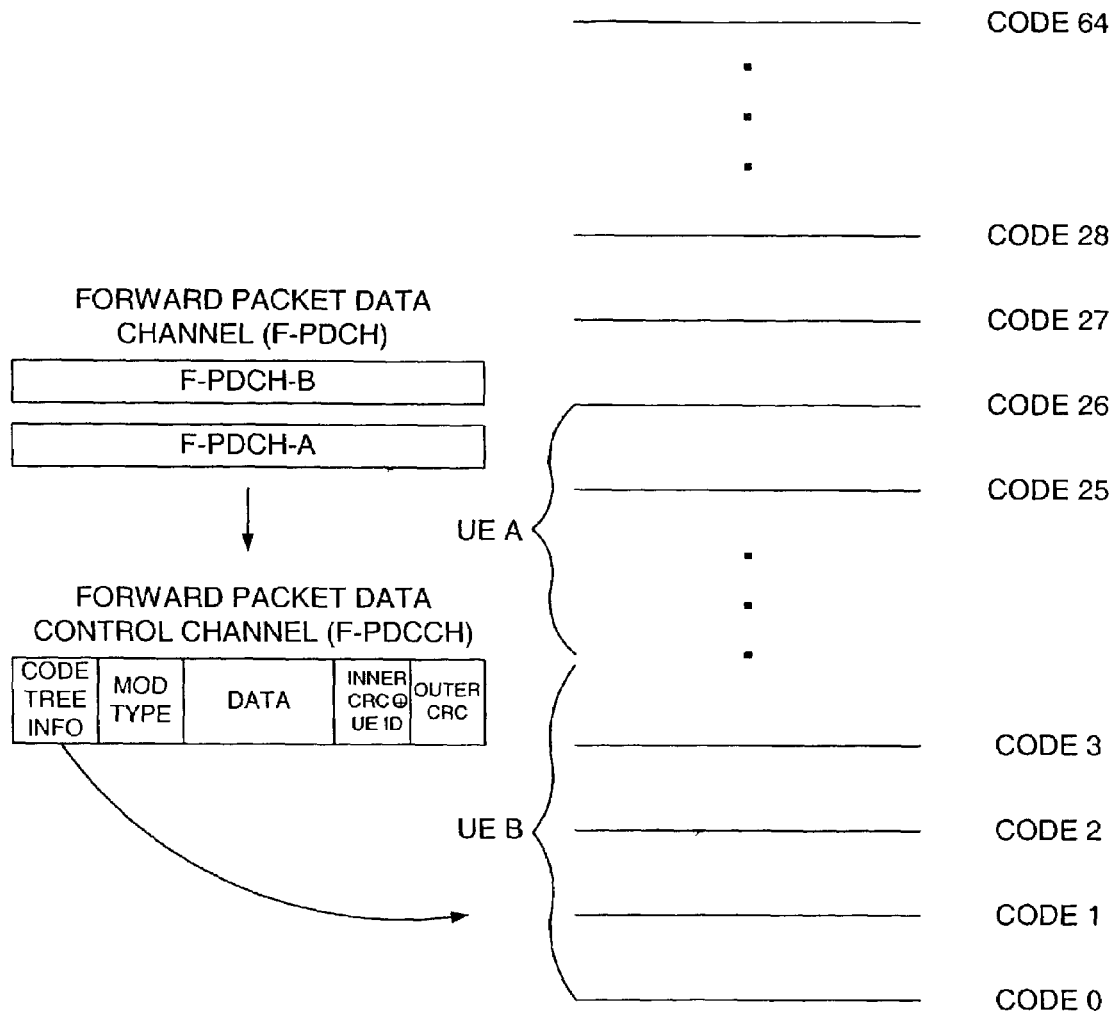
FIG. 2 illustrates a decoding and cancellation process for a near mobile in accordance with an exemplary embodiment of the invention.

FIG. 2 illustrates a decoding and cancellation process for near mobile A in accordance with an exemplary embodiment of the invention. This exemplary embodiment is specifically applicable to the 1x evolution for data and voice (1xEV-DV) service. However, the process may be used to configure other related services. The decoding process starts with mobile A monitoring the forward packet data control channels (F-PDCCH), which provides the necessary control information for the forward packet data channel (F-PDCH). The forward packet data control channel (F-PDCCH) is then examined to determine whether the packet data is intended for mobile A. As described above, the scheduler schedules the F-PDCCH such that the F-PDCCH intended for mobile A is decoded last. In the exemplary embodiment, the process initially examines F-PDCCH by checking the outer Cyclic Redundancy Code (CRC) first and then the inner CRC, if the outer CRC passes. If both CRCs pass, the F-PDCH packet corresponding to this F-PDCCH is intended for mobile A.

In the exemplary embodiment, the decoding of the initial F-PDCCH reveals that the packet is not intended for mobile A because the outer CRC passes but the inner CRC fails. In this case, the packet in F-PDCH is intended for mobile B or some other mobile in the cell. Furthermore, the F-PDCCH reveals the code tree information by providing information about which Walsh codes to use to decode the data signal for mobile B. For example, the code tree information might reveal that Walsh codes 0 through 3 should be used for decoding the signal for mobile B. The Walsh codes are orthogonal codes used to separate signals intended for different users.

The decoding of the F-PDCCH and the F-PDCH continues until the process determines that the packet corresponding to the current F-PDCCH is intended for the near mobile A, when both the outer and the inner CRC checks pass. In the exemplary embodiment of FIG. 2, the last F-PDCCH reveals the code tree information for mobile A. For example, the code tree information may reveal that Walsh codes 24 through 26 should be decoded for mobile A. Once the near mobile A has decoded all the data packets of all other mobiles transmitted by the base station in one transmission interval, the process operates to cancel out from the mobile A signal the multiple access interference caused by the mobile B signal.

Figure 3A:
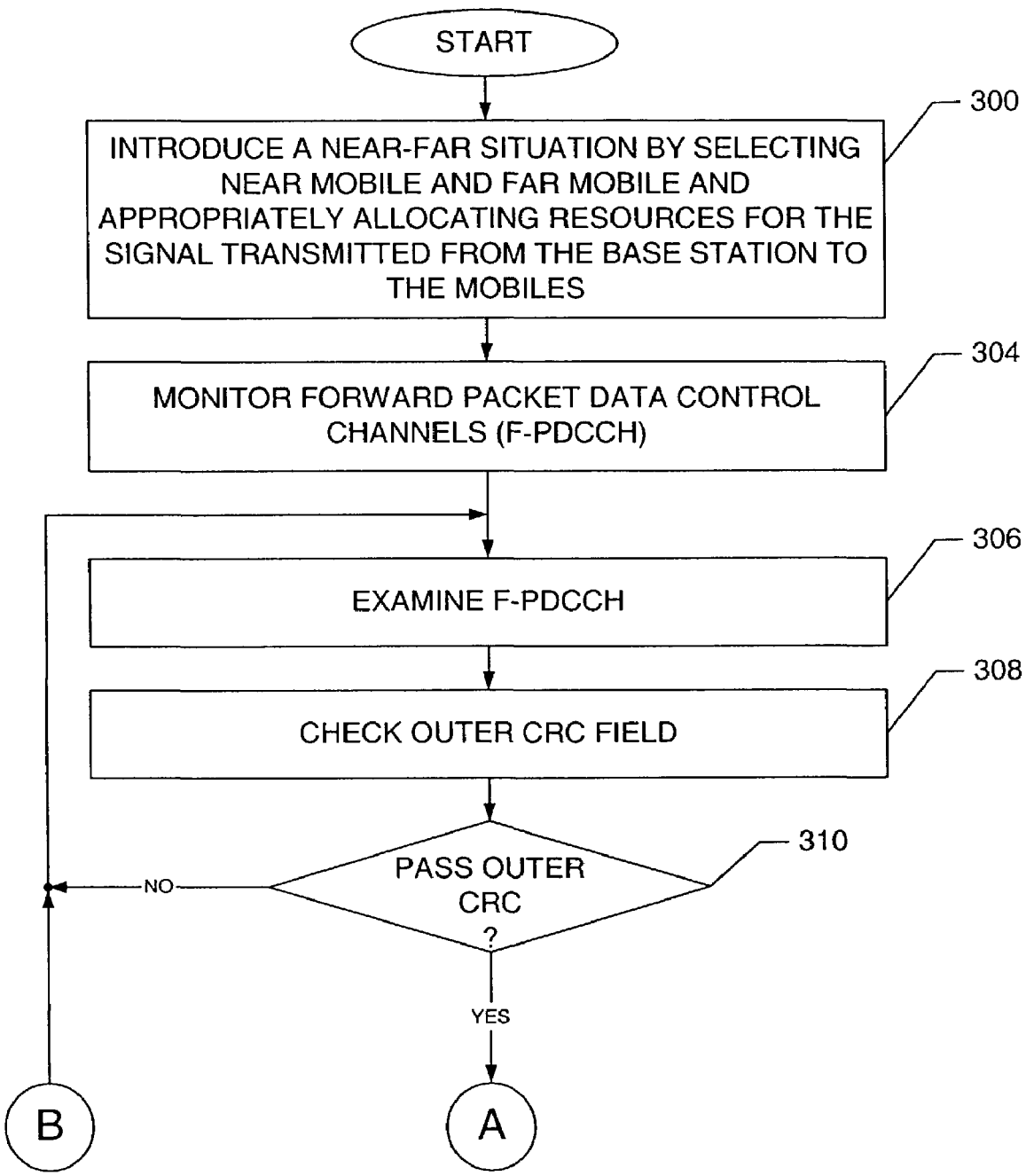
FIGS. 3A and 3B comprise a flowchart describing the decoding and cancellation process in accordance with an exemplary embodiment of the invention.
Figure 3B:
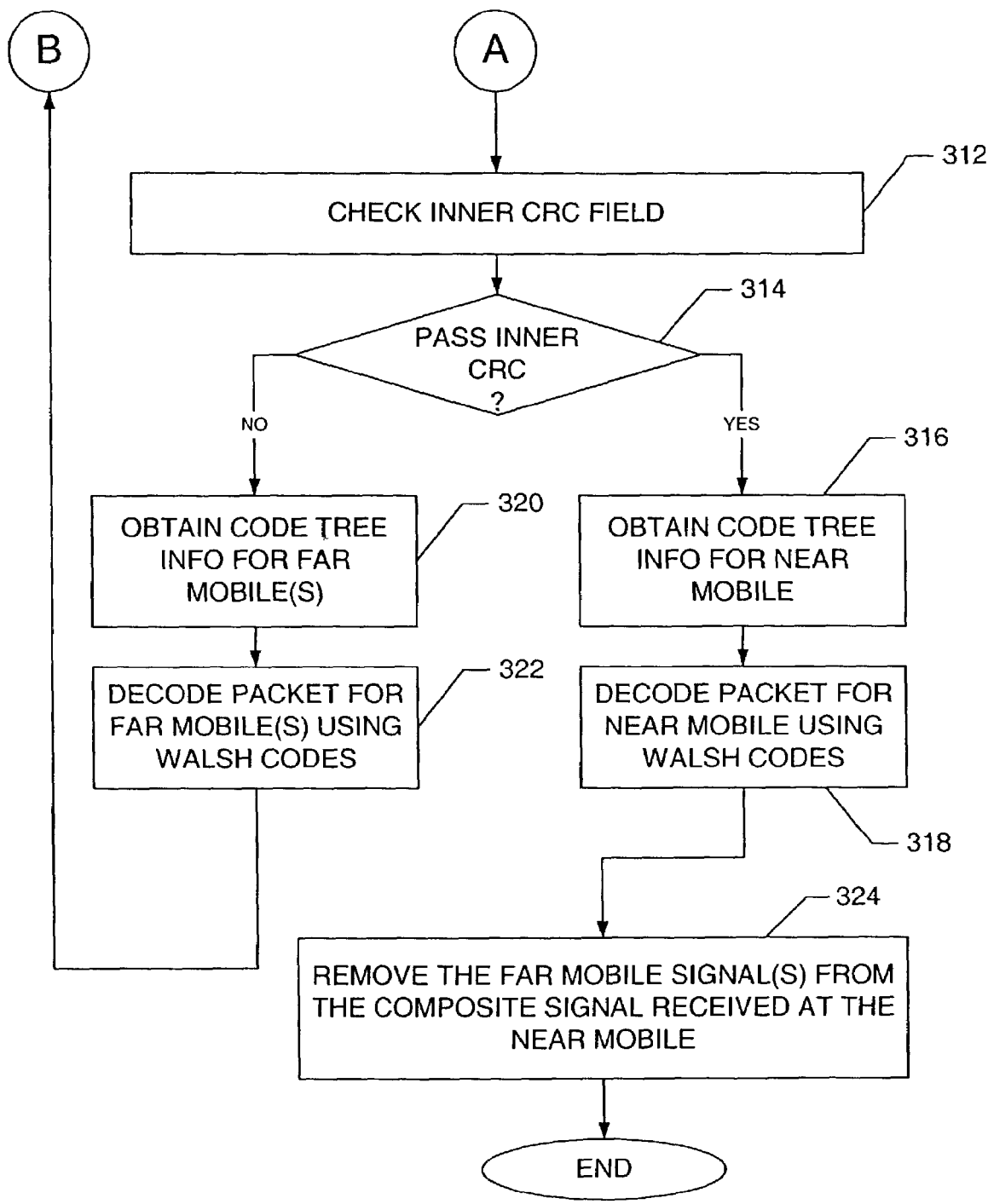

FIGS. 3A and 3B comprise a flowchart describing the decoding and cancellation process in accordance with an exemplary embodiment of the invention. The exemplary embodiment is specifically applicable to 1xEV-DV service. However, the process may be used to configure other related services.

Initially, the scheduler configures the base station transceiver into a near-far situation, at 300, by appropriately allocating resources for signals transmitted from the base station to the mobiles. In one embodiment, the near-far situation is configured by selecting a near mobile and a far mobile, and allocating resources among these and other mobiles. The data is then packetized for transmission during a transmission interval such that the data intended for the far mobile is transmitted along with the data intended for the near mobile. The near mobile may be selected as a mobile to which the base station allocates the least amount of power for data transmission. The far mobile may be selected as a mobile to which the base station allocates the most amount of power for data transmission. Hence, decoding and canceling the far mobile signal from the signal received at the near mobile may provide significant increase in the signal-to-noise-ratio (SINR), and in turn, the throughput for the near mobile.

In another embodiment, the near-far situation configures the base station transceiver by selecting a near mobile and a plurality of far mobiles, and allocating resources among these and other mobiles. The data is then packetized for transmission such that the data intended for the near mobile is transmitted last, and all others are transmitted prior to the that data transmission. In this embodiment, the selection of the far mobiles may be made by selecting a number of mobiles with power allocated by the base station for transmission of data being above a certain level. By adjusting this level, the number of near mobiles selected for signal cancellation processing may be varied.

In FIG. 3A, the decoding process starts at 304 with the near mobile monitoring a forward packet data control channel (F-PDCCH), which provides the necessary control information for the forward packet data channel (F-PDCH). The F-PDCCH is then examined, at 306, to determine whether the packet data in the corresponding F-PDCH is intended for the near mobile. In introducing the near-far situation, the scheduler in the base station for 1xEV-DV service has scheduled the packets such that the F-PDCCH intended for the near mobile can be decoded at the end. Thus, if the near mobile determines that the packet data is intended for itself, the decoding process will terminate once the packet is processed.

The near mobile initially examines the F-PDCH packet by checking the outer CRC field, at 308. If the outer CRC of the current F-PDCCH passes, at 310, then the inner CRC field of the F-PDCCH packet is checked at 312. Since the inner CRC field also includes the user identification (ID), the inner CRC field of the F-PDCCH and the inner CRC of the near mobile will not match unless the packet data is specifically intended for the near mobile. Hence, if the inner CRC check fails, at 314, it can be determined that the packet is intended for a far mobile. In this case, the Walsh code(s) used for the far mobile is obtained, at 320, from the code tree information field of the F-PDCCH. The data packets intended for the far mobile are then decoded, at 322, using the obtained Walsh code(s). The near mobile may further examine the next F-PDCCH packet for additional far mobile data packets or near mobile data packets, at 306.

If the inner CRC check at 314 passes, it is determined that the packet is intended for the near mobile. In this case, the Walsh code(s) used for the near mobile is obtained, at 316, from the code tree information field of the F-PDCCH packet. The corresponding F-PDCH intended for the near mobile is then decoded, at 318, using the obtained Walsh code(s) in F-PDCCH and the decoded F-PDCH from all other far mobiles. The near mobile operates to remove the far mobile signal(s) from the signal received at the near mobile, at 324.

The above-described process for removing interfering far-mobile signals from a selected near mobile signal may be repeated for other mobiles that can be considered as "near" mobiles.

The configuration of the above-described process for 1xEV-DV can be extended to the high-speed downlink packet access (HSDPA) service. Since HSDPA is not configured as hierarchically as 1xEV-DV, the process for the HSDPA service may need additional signaling. For example, HSDPA includes four control channels rather than two. However, the HSDPA service provides explicit code tree information regarding the starting and ending Walsh codes.

As stated earlier, although the operations or procedures described for the scheduling technique was presented in a particular sequence, the operations/procedures may be interchanged without departing from the scope of the invention.

Figure 4:
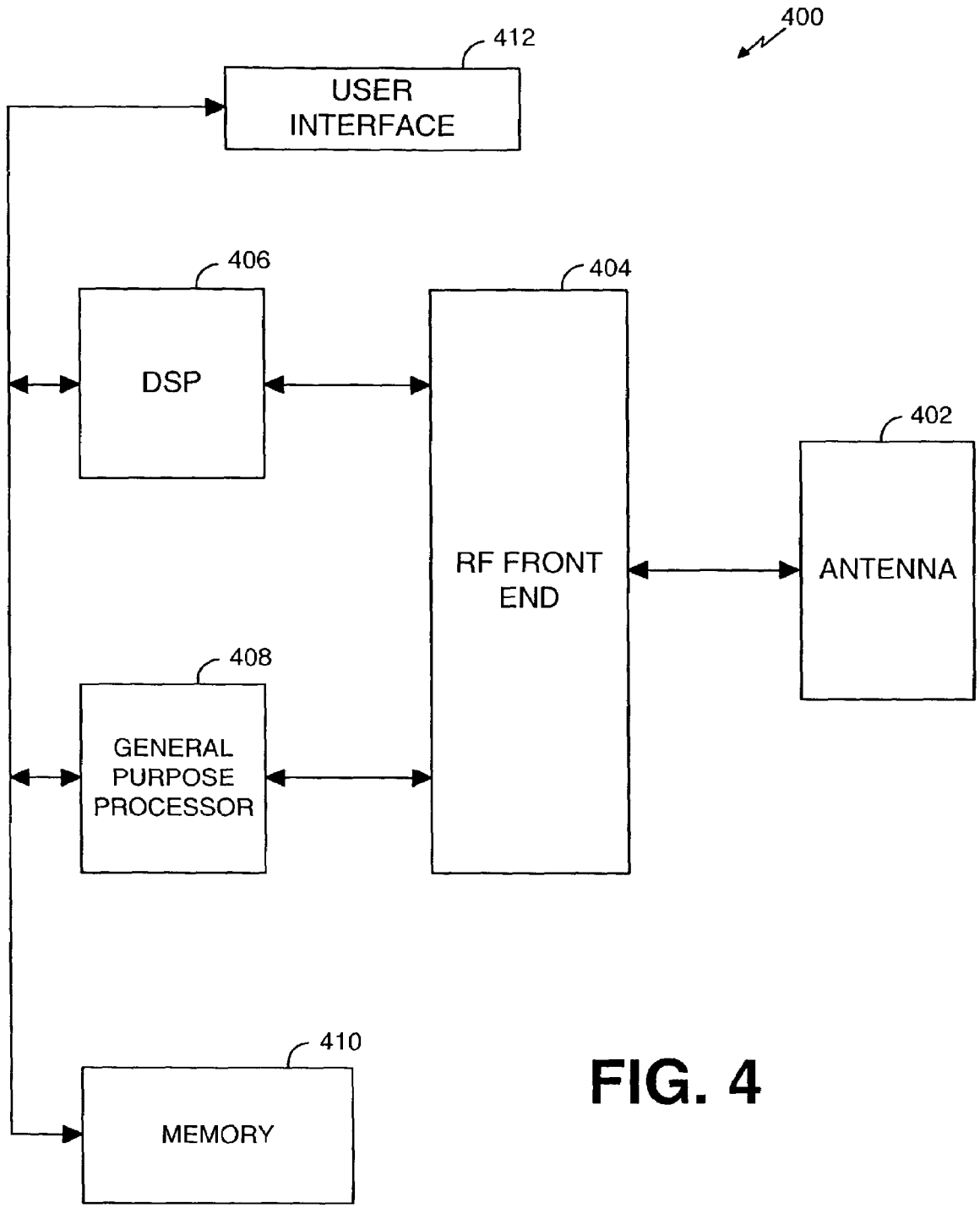
FIG. 4 is a block diagram of a mobile in accordance with an exemplary embodiment of the present invention.

FIG. 4 is a block diagram of a mobile 400 constructed in accordance with an exemplary embodiment of the present invention. The mobile 400 includes an antenna 402, a radio frequency (RF) front end 404, a digital signal processor (DSP) 406, a general purpose processor 408, a memory device 410, and a user interface 412.

The antenna 402 receives forward link signals from one or more base station transceivers. The signals are appropriately amplified, filtered and otherwise processed by the RF front end 404. The output from the RF front end 404 is then applied to the DSP 406. The DSP 406 decodes the received forward link signals. In addition, DSP 406 provides an indication as to the relative quality of the received forward link. The indication of relative quality is stored in the memory 410. The general purpose processor 408 is coupled to the DSP 406 and to the memory 410. The general purpose processor 408 reads the indications of relative quality from the memory 410 and determines the rate at which each received forward link can support data, and determines which forward link can support the highest data rate. Once the general purpose processor 408 has selected the forward link that can support the highest data rate, the general purpose processor 408 communicates the selection to the DSP 406, which encodes and modulates the information in data packets, together with any information from the user interface 412, into a reverse link output signal that is provided to the RF front end 404.

The general purpose processor 408 may also direct the DSP 406 to examine the F-PDCCH packet by checking the outer and the inner CRC fields. The DSP 406 obtains the Walsh code(s) used for the near and far mobiles and decodes the data packets using the obtained Walsh code(s). Once the DSP 406 has decoded all packets of the far mobiles transmitted by the base station for one transmission interval, the general purpose processor 408 may operate to substantially remove the far mobile signal(s) from the signal received at the antenna 402 of the near mobile. The RF front end 404 processes the reverse link output signal and couples the reverse link output signal to the antenna for transmission to each base station transceiver capable of receiving the signal.

Figure 5:
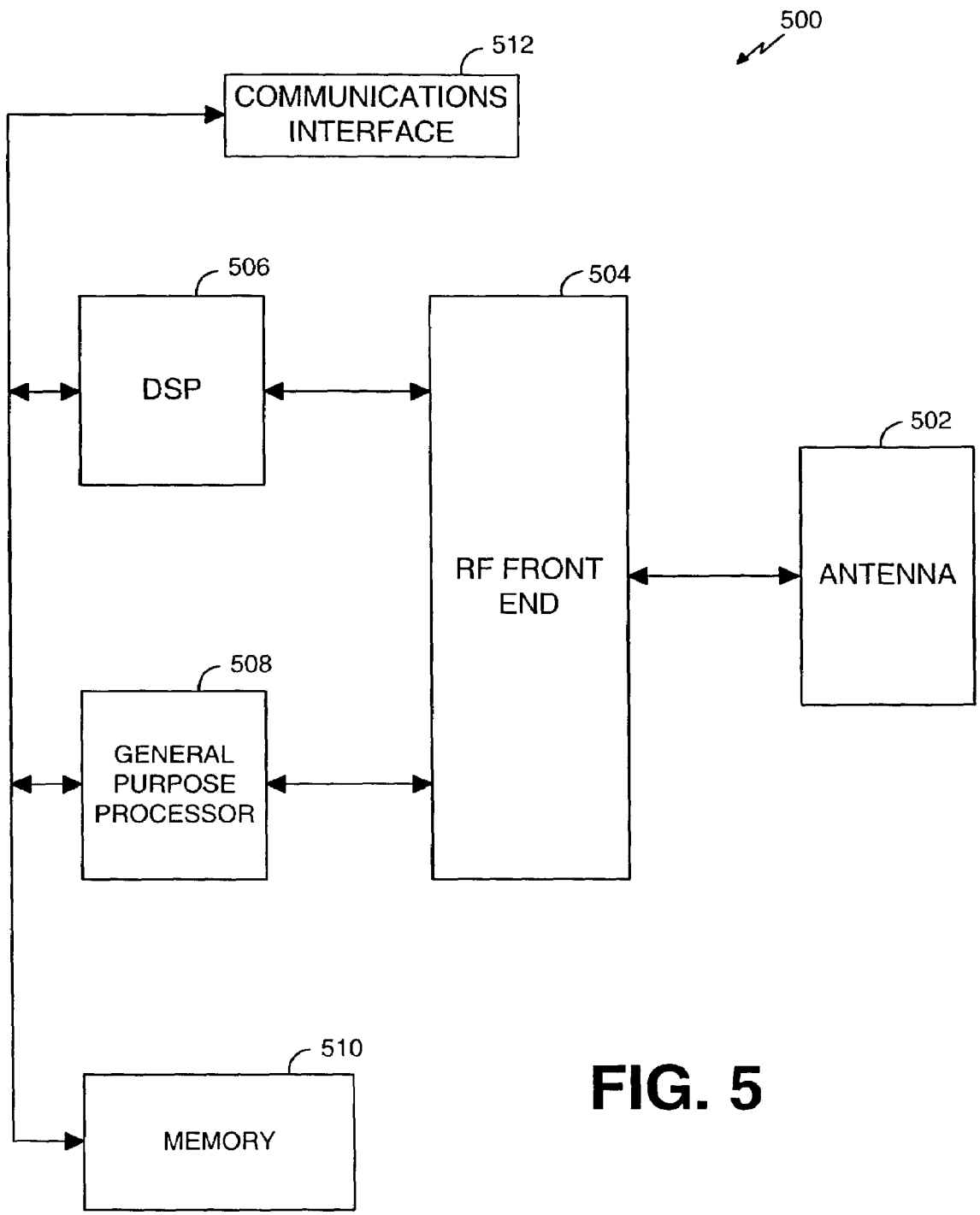
FIG. 5 is a block diagram of a base station transceiver in accordance with an exemplary embodiment of the present invention.

FIG. 5 is a block diagram of a base station transceiver 500 constructed in accordance with an exemplary embodiment of the present invention. The base station 500 includes a transmitter, such as an antenna 502 and a radio frequency (RF) front end 504. The base station 500 further includes a digital signal processor (DSP) 506, a general purpose processor 508, a memory device 510, and a communication interface 512.

In the exemplary embodiment, the antenna 502 receives reverse link signals that have been transmitted from nearby mobiles 400. The antenna couples these received signals to an RF front end 504 which filters and amplifies the signals. The signals are coupled from the RF front end 504 to the DSP 506 and to the general purpose processor 508 for demodulation, decoding, further filtering, etc. Upon decoding of data rate control (DRC) channels from the received reverse link signals, the DSP 506 stores the decoded DRC signal in the memory 510. In addition, the DSP 506 determines the strength of the transmitted signal power from the mobile 400 for each received reverse link signal. It should be noted that the base station 500 typically receives reverse link signals from more than one mobile 400 at a time.

The general purpose processor 508 communicates to the DSP 506 the amount of power that should be allocated to each reverse link power control (RLPC) Channel. Based upon the allocation of power to each RLPC Channel, the DSP 506 modulates and encodes the forward link signals to be transmitted by the base station 500. The signal is coupled to the RF front end 504. The RF front end couples the signal to the antenna 502, which transmits the forward link signal to the mobile. The general purpose processor 508 may also include a scheduler that introduces the above-described near-far situation and configures the transmission of data packets to mobiles 400 so that a near mobile may decode and substantially remove the far mobile signal(s) from the signal received at the near mobile.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a base station for a wireless communication system, the method comprising:
   at the base station:
      receiving channel state feedback information from a first mobile station and a second mobile station:
      configuring for a near-far situation of the first and second mobile stations, including:
         selecting the first mobile station as a near mobile station and the second mobile station as a far mobile station based on the received channel state feedback information;
         allocating resources among a plurality of mobile stations including the near and far mobile stations;
         packetizing data and control information for transmission during a transmission interval into forward-link signals such that a signal intended for the far mobile station is transmitted along with a signal intended for the near mobile station in a single channel and that the near mobile station is able to remove the signal intended for the far mobile station from a received signal based on the control information; and
      transmitting the forward-link signals to the near and far mobile stations.

2. The method of claim 1, wherein:
   the wireless communication system uses a 1x evolution for data and voice (1xEVDV) service; and
   the forward link signals comprise:
      the signal intended for the near mobile station comprising first packet data on a forward packet data channel (F-PDCH);
      the signal intended for the far mobile station comprising second packet data on the forward packet data channel (F-PDCH); and
      the control information on a forward packet data control channel (F-PDCCH).

3. The method of claim 2, wherein:
   the control information includes a control packet corresponding to each packet data; and
   each control packet comprises code tree information, an outer cyclic redundancy code (CRC), and an inner CRC.

4. The method of claim 3, wherein the near mobile station checks the outer CRC and then the inner CRC of each control packet to determine whether the corresponding data packet is intended for the near mobile station or for the far mobile station.

5. The method of claim 1, wherein the near and far mobile stations are defined as near and far, respectively, based on measured signal to interference and noise ratios (SINRs) of signals at the near and far mobile stations, respectively.

6. A base station for a wireless communication system, the base station comprising:
   a transceiver configured to receive channel state feedback information from a first mobile station and a second mobile station;
   a processor including a scheduler configured to:
      select the first mobile station as a near mobile station and the second mobile station as a far mobile station based on the received channel state feedback information;
      allocate resources among a plurality of mobile stations including the near and far mobile stations; and
      packetize data and control information for transmission during a transmission interval into forward-link signals such that a signal intended for the far mobile station is transmitted along with a signal intended for the near mobile station in a single channel and that the near mobile station is able to remove the signal intended for the far mobile station from a received signal based on the control information; and
   the transceiver is further configured to transmit the forward-link signals to the near and far mobile stations.

7. The base station of claim 6, wherein:
   the wireless communication system uses a 1x evolution for data and voice (1xEVDV) service; and
   the forward link signals comprise:
      the signal intended for the near mobile station comprising first packet data on a forward packet data channel (F-PDCH);
      the signal intended for the far mobile station comprising second packet data on the forward packet data channel (F-PDCH); and
      the control information on a forward packet data control channel (F-PDCCH).

8. The method of claim 7, wherein:
   the control information includes a control packet corresponding to each packet data; and
   each control packet comprises code tree information, an outer cyclic redundancy code (CRC), and an inner CRC.

9. The method of claim 8, wherein the near mobile station checks the outer CRC and then the inner CRC of each control packet to determine whether the corresponding packet data is intended for the near mobile station or for the far mobile station.

10. A mobile station for a wireless communication system, the mobile station comprising:
    a transceiver configured to:
       transmit channel state feedback information to a base station; and
       receive from the base station forward-link signals including control information in a single channel; and
    a processor configured to:
       determine from the received forward-link signals, a first signal intended for the mobile station as a near mobile station and a second signal intended for a second mobile station as a far mobile station, wherein both the first signal and second signal were received in the single channel and the mobile station is classified as a near mobile station based on the transmitted channel state feedback information; and remove the second signal intended for the far mobile station from the forward-link signals received by the near mobile station based on the received control information.

11. The mobile station of claim 10, wherein the processor is configured to remove the second signal intended for the far mobile station from the forward-link signals received by the near mobile station after an outer and inner CRC fields pass verification.

12. The mobile station of claim 10, wherein:
the wireless communication system uses a 1x evolution for data and voice (1xEVDV) service; and
the first signal comprises first packet data received on a forward packet data channel (F-PDCH);
the second signal comprises second packet data received on the forward packet data channel (F-PDCH); and
the control information is received on a forward packet data control channel (F-PDCCH).

13. The mobile station of claim 12, wherein:
the control information includes a control packet corresponding to each packet data; and
each control packet comprises code tree information, an outer cyclic redundancy code (CRC), and an inner CRC.

14. The method of claim 13, wherein the near mobile station checks the outer CRC and then the inner CRC of each control packet to determine whether the corresponding packet data is intended for the near mobile station or for the far mobile station.

15. A method of operating a mobile station for wireless communication, comprising:
transmitting channel state feedback information to the base station;
receiving forward-link signals including control information from the base station in a single channel;
determining from the received forward-link signals, a first signal intended for the mobile station as a near mobile station and a second signal intended for a second mobile station as a far mobile station, wherein both the first signal and second signal were received in the single channel and the mobile station is classified as a near mobile station based on the transmitted channel state feedback information; and
removing the second signal intended for the far mobile station from the forward-link signals received by the near mobile station based on the control information.

16. The method of claim 15, wherein prior to removing the second signal intended for the far mobile station from the forward-link signals received by the near mobile station, determining that an outer and inner CRC fields pass verification.

17. The method of claim 15, wherein:
the mobile station and the base station use a 1x evolution for data and voice (1xEV-DV) service for wireless communication;
the first signal comprises first packet data received on a forward packet data channel (F-PDCH);
the second signal comprises second packet data received on the forward packet data channel (F-PDCH); and
the control information is received on a forward packet data control channel (FPDCCH).

18. The method of claim 17, wherein:
the control information includes a control packet corresponding to each packet data; and
each control packet comprises code tree information, an outer cyclic redundancy code (CRC), and an inner CRC.

19. The method of claim 18, wherein the near mobile station checks the outer CRC and then the inner CRC of each control packet to determine whether the corresponding packet data is intended for the near mobile station or for the far mobile station.

20. A base station for a wireless communication system, comprising:
means for receiving channel state feedback information from a first mobile station and a second mobile station;
means for configuring for a near-far situation of the first and second mobile stations, including:
means for selecting the first mobile station as a near mobile station and the second mobile station as a far mobile station based on the received channel state feedback information;
means for allocating resources among a plurality of mobile stations including the near and far mobile stations;
means for packetizing data and control information for transmission during a transmission interval into forward-link signals such that a signal intended for the far mobile station is transmitted along with a signal intended for the near mobile station in a single channel and that the near mobile station is able to remove the signal intended for the far mobile station from a received signal based on the control information; and
means for transmitting the forward-link signals to the near and far mobile stations.

21. A mobile station for wireless communication, comprising:
means for transmitting channel state feedback information to the base station;
means for receiving forward-link signals including control information from the base station in a single channel;
means for determining from the received forward-link signals, a first signal intended for the mobile station as a near mobile station and a second signal intended for a second mobile station as a far mobile station, wherein both the first signal and second signal were received in the single channel and the mobile station is classified as a near mobile station based on the transmitted channel state feedback information; and
means for removing the second signal intended for the far mobile station from the forward-link signals received by the near mobile station based on the control information.

22. A computer-readable medium including program code stored thereon, comprising:
program code to receive channel state feedback information from a first mobile station and a second mobile station;
program code to configure for a near-far situation of the first and second mobile stations, including:
program code to select the first mobile station as a near mobile station and the second mobile station as a far mobile station based on the received channel state feedback information;
program code to allocate resources among a plurality of mobile stations including the near and far mobile stations;
program code to packetize data and control information for transmission during a transmission interval into forward-link signals such that a signal intended for the far mobile station is transmitted along with a signal intended for the near mobile station in a single channel and that the near mobile station is able to remove the signal intended for the far mobile station from a received signal based on the control information; and program code to transmit the forward-link signals to the near and far mobile stations.

23. A computer-readable medium including program code stored thereon, comprising:

program code to transmit channel state feedback information to the base station;

logic configure to receive forward-link signals including control information from the base station in a single channel;

program code to determine from the received forward-link signals, a first signal intended for the mobile station as a near mobile station and a second signal intended for a second mobile station as a far mobile station, wherein both the first signal and second signal were received in the single channel and the mobile station is classified as a near mobile station based on the transmitted channel state feedback information; and program code to remove the second signal intended for the far mobile station from the forward-link signals received by the near mobile station based on the control information.

\* \* \* \* \*

UNITED STATES PATENT AND TRADEMARK OFFICE
CERTIFICATE OF CORRECTION

PATENT NO. : 7,653,028 B2 Page 1 of 1
APPLICATION NO. : 10/264434
DATED : January 26, 2010
INVENTOR(S) : Shiu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 51 days.

Signed and Sealed this

Twenty-eighth Day of December, 2010

David J. Kappos
*Director of the United States Patent and Trademark Office*